3,056,649
TANTALUM AND COLUMBIUM PENTA-
FLUORIDE PRODUCTION
Robert A. Gustison, Grand Island, N.Y., assignor to Union Carbide Corporation, a corporation of New York
No Drawing. Filed Feb. 16, 1960, Ser. No. 8,900
8 Claims. (Cl. 23—88)

The present invention relates to the production of pentafluorides of tantalum and columbium.

Tantalum and columbium are found in a number of minerals and are closely associated with each other. They usually occur in combination with one or more other materials, such as iron, manganese, silicon and titanium. Oftentimes, the content of tantalum and columbium in the minerals is sufficiently high to warrant the upgrading and processing of these materials to recover the metals.

One method of upgrading tantalum and/or columbium values consists of reducing the tantalum- and/or columbium-containing materials with a carbonaceous reducing agent in a suitable furnace, followed by magnetic or acid beneficiation. The product, which is an infusible cake, contains the crude carbides of tantalum and/or columbium.

There are several known methods for processing the carbided materials so produced. One method employs the chlorination of the carbided materials to form metal chlorides. Another process comprises the reoxidation of the carbided materials to produce an acceptable tantalum and/or columbium oxide, from which tantalum and/or columbium metals may be finally extracted by any known method.

However, regardless of the method heretofore used in treating the carbides of tantalum and/or columbium, a lengthy procedure is involved which makes the winning of tantalum and/or columbium from carbided materials very cumbersome and expensive.

It is, accordingly, an object of the present invention to provide a one-step process to produce substantially pure pentafluorides of tantalum and/or columbium directly from carbided materials containing these metals.

Other objects and advantages of the present invention will be apparent from the following description and from the appended claims.

Briefly stated, the process which satisfies the requirements of the present invention comprises the reaction of tantalum and/or columbium carbide with a stream of anhydrous hydrofluoric acid at temperatures of at least about 400° C. and the subsequent condensation of the pentafluoride of tantalum and/or columbium from the gaseous products of the reaction.

The primary reactions which take place may be expressed by the following equations:

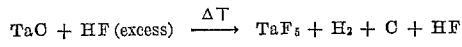
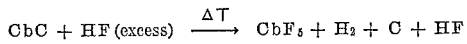

It was found that, by maintaining the temperature of the reaction zone at a temperature of at least about 400° C., the carbides of tantalum and/or columbium are readily converted to their respective pentafluorides. Preferred temperatures for the tantalum carbide reaction are from about 400° C. to about 600° C., and the optimum range is from about 450° C. to about 525° C. Similarly, by maintaining the temperature of the reaction zone preferably from about 650° C. to about 825° C., the optimum range being from about 675° C. to about 750° C., columbium carbide is readily converted to columbium pentafluoride.

Thus, if the carbided material is essentially tantalum carbide, the reaction zone is preferably kept at from about 400° C. to about 600° C., while, if the carbides material is essentially columbium carbide, the reaction zone is preferably maintained at from about 650° C. to about 825° C. In the case of carbided mixtures of tantalum and columbium, the optimum temperatures to be employed in the reaction vary between about 500° C. and about 700° C., depending on the relative percent of tantalum and columbium in the mixture.

It is important in the process that the carbided reactant be comminuted to a fine powder, preferably of the order of 325 mesh size or smaller. The finer the carbide's particle size, the easier and more rapid will be the reaction between the solid carbide and the gaseous hydrofluoric acid.

The reaction may be carried out in standard furnace equipment, such as, for example, a horizontal reactor, in which case the hydrofluoric gas stream is passed over or through the comminuted carbide distributed in a suitable container. The furnace may also be of the vertical type, in which case the hydrofluoric gas stream is allowed to pass vertically through the comminuted carbide, the carbide being either in a static or in a fluidized state.

In any event, it is important that the hydrofluoric acid employed in the reaction be anhydrous.

All gaseous products of the reaction are vented from the reaction zone to a collection and condensing zone, which should be maintained at temperatures above the condensation temperature of the anhydrous hydrofluoric acid, but below the boiling point of the pentafluorides of tantalum and/or columbium, and preferably at temperatures of about 100° C.

By maintaining the condensation zone at a temperature higher than the condensation temperature of the unreacted anhydrous hydrofluoric acid, for example, at about 100° C., all of the tantalum and/or columbium pentafluorides will be separated from the excess anhydrous hydrofluoric acid, which is allowed to escape together with the hydrogen by-product. By this procedure, it can be seen that it is possible to obtain high pentafluoride recoveries.

The following examples are set forth to merely illustrate the invention and should not be construed as limitative thereupon.

*Example I*

A quantity of tantalum carbide, weighing 100 grams, and containing 90.3 percent by weight of tantalum was comminuted to a particle size of 400 mesh and smaller, distributed in a graphite boat and introduced into a horizontal tube furnace. It was subsequently reacted for three hours with a stream of anhydrous hydrofluoric acid passed over the graphite boat, at a temperature of from 510° C. to 525° C. The anhydrous hydrofluoric acid was introduced into the reaction zone at a rate of 1.33 grams per hour. The gaseous products of the reaction, namely, tantalum pentafluoride and hydrogen were vented, together with unreacted anhydrous hydrofluoric acid, from the reaction zone to a condensing zone. The condensed tantalum pentafluoride was collected in the condensing zone and was found to constitute 92 percent by weight of the tantalum value in the original starting material. In the reaction zone remained 10.8 grams of solid material analyzing 29 percent by weight tantalum and 70 percent by weight carbon.

*Example II*

A quantity of columbium carbide, weighing 100 grams, and containing 83.5 percent by weight of columbium was comminuted to a particle size of 400 mesh and smaller, distributed in a graphite boat, and introduced into a horizontal tube furnace. It was subsequently reacted for three hours with a stream of anhydrous hydrofluoric acid passed over the graphite boat, at a temperature of from 700° C. to 710° C. The anhydrous hydrofluoric acid was introduced into the reaction zone at a rate of 1.33 grams per hour. The gaseous products of the reaction, namely, columbium pentafluoride and hydrogen were vented, together with unreacted anhydrous hydrofluoric acid, from the reaction zone to a condensing zone. The condensed columbium pentafluoride was collected in the condensing zone and was found to constitute 80.8 percent by weight of the columbium value in the original starting material. In the reaction zone remained 40.8 grams of solid material analyzing 16.0 percent columbium and 39 percent by weight carbon.

*Example III*

A mixture of tantalum and columbium carbides, weighing 7.5 grams and containing 22.42 percent by weight of tantalum and about 17 percent by weight of columbium, was comminuted to a particle size of 400 mesh and smaller, distributed in a graphite boat and introduced into a horizontal tube furnace. It was subsequently reacted for thirty hours with a stream of anhydrous hydrofluoric acid passed over the graphite boat at temperatures ranging from about 400° C. to about 700° C. The gaseous products of the reaction, namely, tantalum pentafluoride, columbium pentafluoride and hydrogen were vented, together with unreacted anhydrous hydrofluoric acid, from the reaction zone to a condensing zone. The condensed metal pentafluorides were collected in the condensing zone and were found to constitute 95 percent by weight of the tantalum and columbium values in the original starting material.

What is claimed is:

1. A process for the production of pentafluorides of at least one metal selected from the group consisting of tantalum and columbium, which comprises reacting a finely-divided carbide of said selected metal with a stream of gaseous and anhydrous hydrofluoric acid in stoichiometric excess at temperatures of at least about 400° C. to form the gaseous pentafluoride of said selected metal, and condensing said gaseous pentafluoride of said selected metal at a temperature above the condensation temperature of anhydrous hydrofluoric acid.

2. A process for the production of pentafluorides of at least one metal selected from the group consisting of tantalum and columbium, which comprises reacting a finely-divided carbide of said selected metal with a stream of gaseous and anhydrous hydrofluoric acid in stoichiometric excess at temperatures of from about 400° C. to about 825° C. to form the gaseous pentafluoride of said selected metal, and condensing said gaseous pentafluoride of said selected metal at a temperature above the condensation temperature of anhydrous hydrofluoric acid.

3. The process according to claim 1, in which the carbide of said selected metal is comminuted to a particle size of 325 mesh and smaller.

4. The process according to claim 1, in which the condensation of the gaseous pentafluoride is effected at a temperature of about 100° C.

5. A process for the preparation of tantalum pentafluoride, which comprises reacting a finely-divided tantalum carbide with a stream of gaseous and anhydrous hydrofluoric acid in stoichiometric excess at temperatures of from about 400° C. to about 600° C. to form the gaseous tantalum pentafluoride, and condensing said gaseous tantalum pentafluoride at a temperature above the condensation temperature of anhydrous hydrofluoric acid.

6. The process in accordance with claim 5, in which said tantalum carbide is reacted with said gaseous and anhydrous hydrofluoric acid at temperatures of from about 450° C. to about 525° C., and the condensing zone is maintained at temperature of about 100° C.

7. A process for the preparation of columbium pentafluoride, which comprises reacting a finely-divided columbium carbide with a stream of gaseous and anhydrous hydrofluoric acid in stoichiometric excess at temperatures of from about 650° C. to about 825° C. to form the gaseous columbium pentafluoride, and condensing said gaseous columbium pentafluoride at a temperature above the condensation temperature of anhydrous hydrofluoric acid.

8. The process in accordance with claim 7, in which said columbium carbide is reacted with said gaseous and anhydrous hydrofluoric acid at temperatures of from about 675° C. to about 750° C., and the condensing zone is maintained at temperatures of about 100° C.

References Cited in the file of this patent

UNITED STATES PATENTS

| | | |
|---|---|---|
| 2,816,815 | Ruhoff et al. | Dec. 17, 1957 |
| 2,894,887 | Kolk et al. | July 14, 1959 |
| 2,975,049 | Jazwinski et al. | Mar. 14, 1961 |

OTHER REFERENCES

Barksdale: "Titanium," page 316 (1949).